Figure 1:
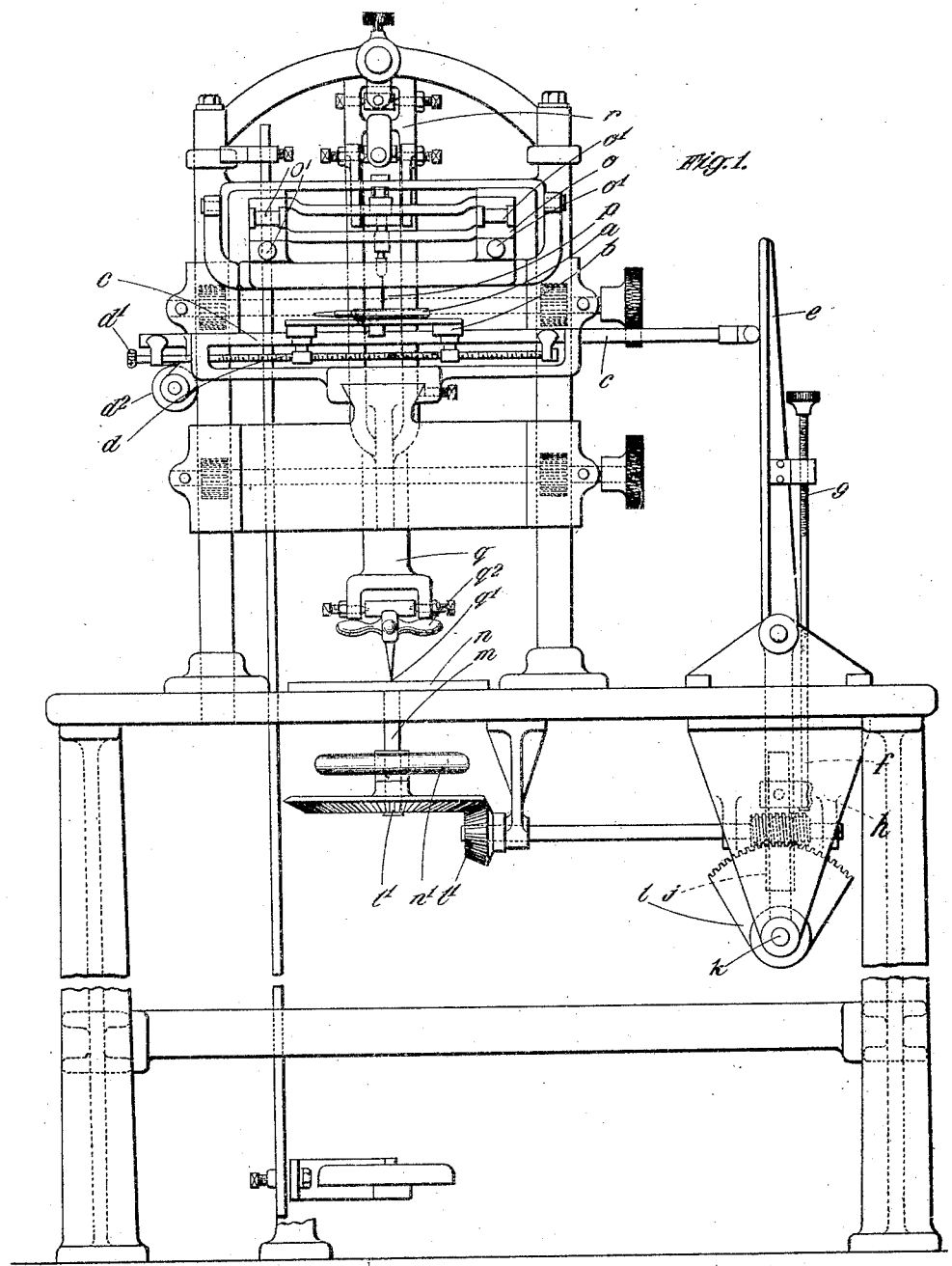

G. H. AND H. H. ZEAL.
APPARATUS FOR SIMULTANEOUSLY PRODUCING A PLURALITY OF GRADUATIONS, SCALES, SERIES OF NUMBERS, LETTERS, OR THE LIKE.
APPLICATION FILED MAY 17, 1919.

1,368,532.

Patented Feb. 15, 1921.
5 SHEETS—SHEET 1.

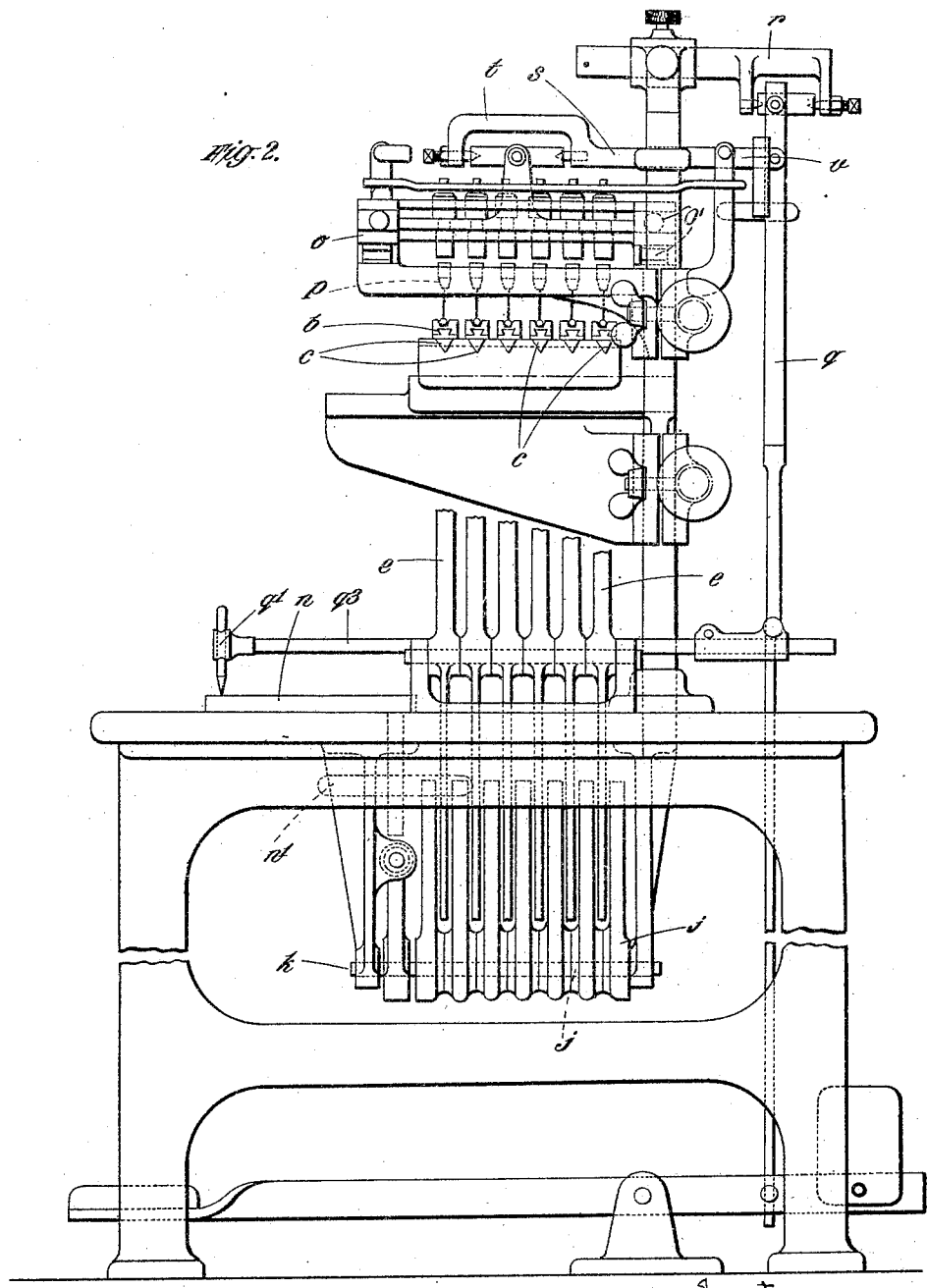

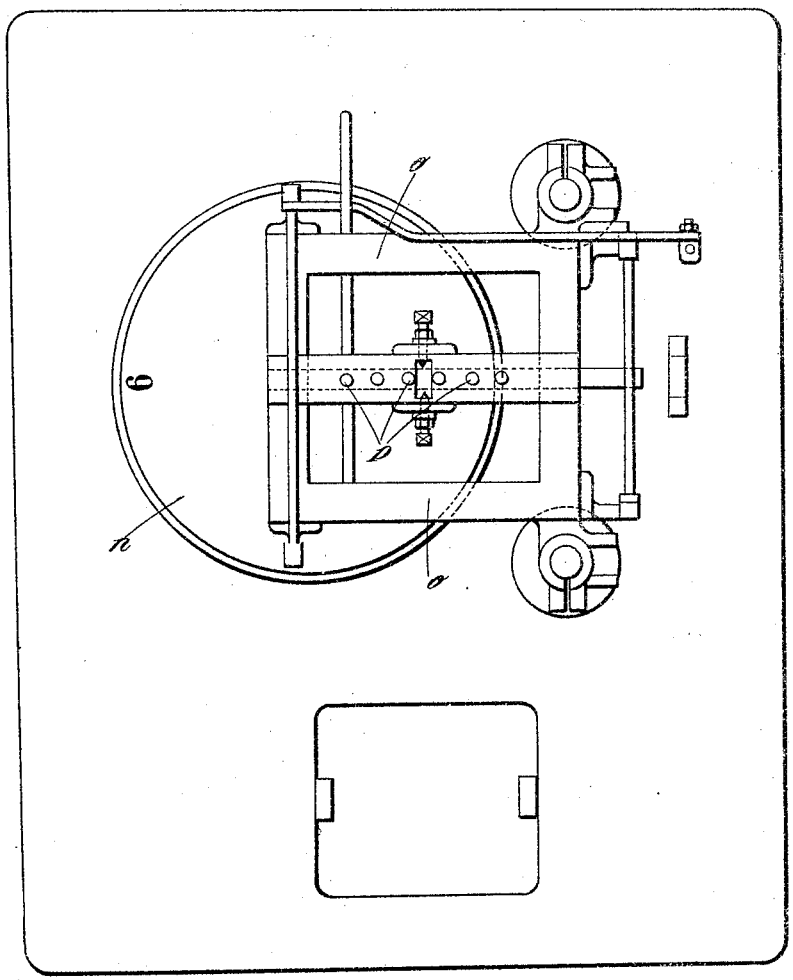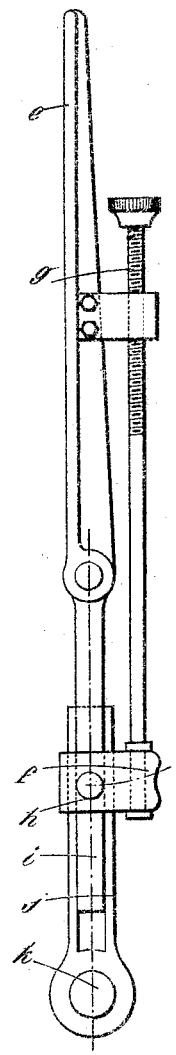

G. H. AND H. H. ZEAL.
APPARATUS FOR SIMULTANEOUSLY PRODUCING A PLURALITY OF GRADUATIONS, SCALES, SERIES OF NUMBERS, LETTERS, OR THE LIKE.
APPLICATION FILED MAY 17, 1919.
1,368,532.
Patented Feb. 15, 1921.
5 SHEETS—SHEET 4.
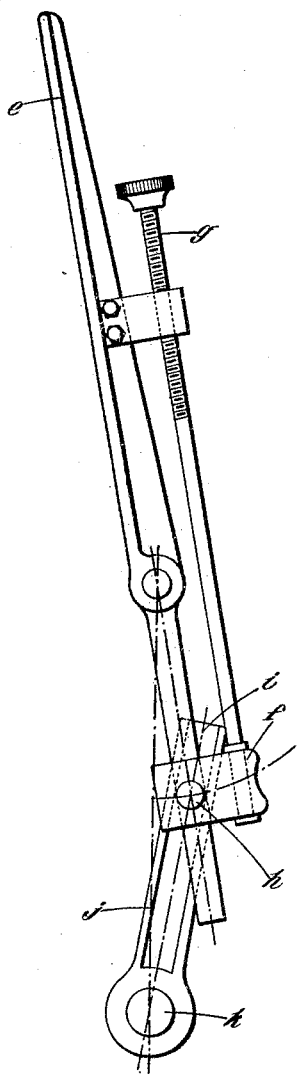
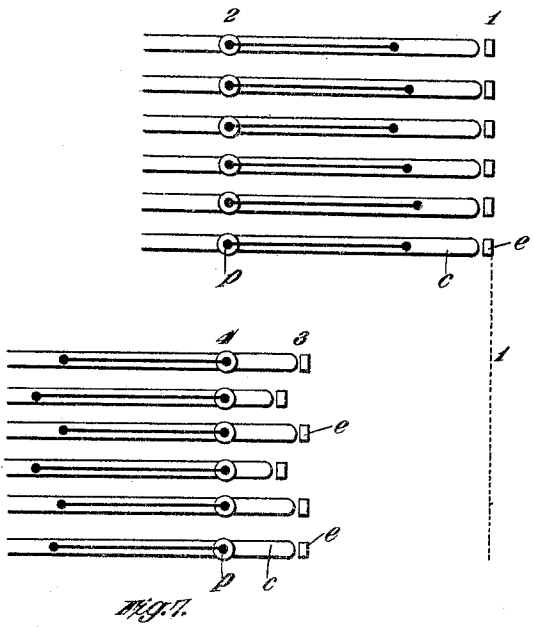

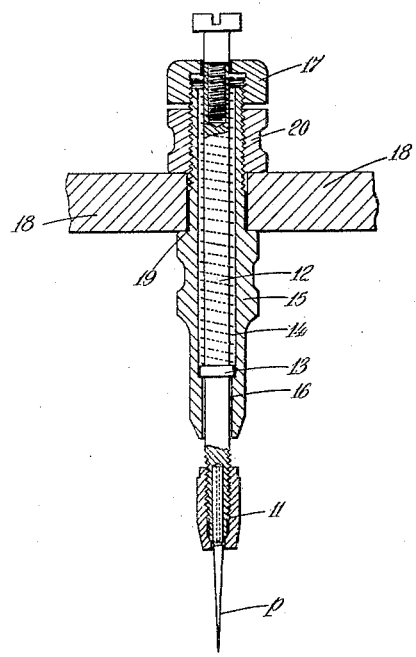

UNITED STATES PATENT OFFICE.

GILES HENRY ZEAL AND HERBERT HENRY ZEAL, OF LONDON, ENGLAND.

APPARATUS FOR SIMULTANEOUSLY PRODUCING A PLURALITY OF GRADUATIONS, SCALES, SERIES OF NUMBERS, LETTERS, OR THE LIKE.

1,368,532. Specification of Letters Patent. Patented Feb. 15, 1921.

Application filed May 17, 1919. Serial No. 297,932.

*To all whom it may concern:*

Be it known that we, GILES HENRY ZEAL and HERBERT HENRY ZEAL, subjects of the King of Great Britain, and residents of 82 Turnmill street, in the city of London, England, have jointly invented a certain new and useful Improvement in Apparatus for Simultaneously Producing a Plurality of Graduations, Scales, Series of Numbers, Letters, or the like, of which the following is a specification.

This invention has for its object to provide an improved apparatus for simultaneously producing a plurality of graduations, scales, series of numbers, letters, or the like, and for engraving or marking the same on a number of articles simultaneously, the invention being particularly adapted for marking or figuring thermometers where the distances between the markings vary slightly according to the experimentally ascertained graduation.

The graduations, scales, series of numbers, letters or the like, may be produced by direct engraving, for instance by rotary engraving tools, or by acid or like action after a substance, technically known as a "resist" and consisting, *e. g.* of wax, varnish or the like, has been removed from the desired parts by a non-rotary tool. For the sake of simplicity and convenience of description, the tools mentioned will be hereinafter referred to as "markers."

An apparatus made in accordance with this invention consists of the combination with a master plate mounted upon a rotary table, of a series of markers operated by pantograph mechanism from said master plate, and a series of levers capable of adjustment so as to give an equal throw throughout the series of any required length or a throw of different lengths throughout the series, the said levers being operated from said master plate and adapted to impart motion to a series of slides which carry the series of articles to be marked and which are moved by said levers from point to point where the markings are to be made as the table carrying the master plates is moved. Where the distance between the markings on each article varies—levers employed are adapted to be adjusted so that the travel of each article may be different from the others as required for the purpose of adjusting the position where the markings are to be made.

As an example:—One form of apparatus made in accordance with this invention for marking a series of articles such as thermometers where the markings vary according to the experimentally obtained graduations comprises the combination with a master plate mounted on a table adapted to have a rotary or other suitable movement, of a row or series of markers operated by a pantograph mechanism from said master plate and a series of adjustable variable throw levers operated from the table which carries the master plate and adapted to impart motion to a series of slides on which the articles to be marked are adjustably mounted; the arrangement being such that the apparatus can be adjusted by bringing the initial points of marking into register with the row or series of markers and moving the master plate table and mechanism to some other or most distant point of marking and there adjusting the variable throw levers to bring all the last mentioned marking points into register with the markers and operating the machine after returning the mechanism to zero or starting point when all the markings on the series of articles can be made successively on all the articles simultaneously.

All the variable throw levers are preferably so arranged that they commence their movement from a zero point where they are all in alinement, and obviously, if the series of markings were all to be equally spaced apart, the stroke of the levers would be equal, but by simple adjustment as described, the markings at points of varying distances apart on each article can be readily accomplished.

By way of illustration the invention will be described with reference to the accompanying drawings, which show a machine for simultaneously figuring a plurality of thermometer stems.

Figure 1 is a front elevation of the said machine, Fig. 2 a side elevation with some parts broken away, and Fig. 3 is a plan, also with parts removed, Figs. 4 and 5 are side elevations to a larger scale, of the variable throw levers and the lever arm which operates the same, Figs. 6 and 7 are diagrams illustrating the method of adjusting the mechanism, and Fig. 8 is a sectional elevation of the marker showing the method of support therefor.

Referring to Figs. 1 to 4 the thermometers $a$, whose stems are to receive the graduation figures, are mounted by suitable clips or clamps on separate carriages or slides $b$ which are movable longitudinally on guide bars $c$ by means of screws $d$ with milled heads $d^1$. Each of the guide bars $c$ is actuated in one direction by a band attached to one of a series of spring drums such as $d^2$ and in the other direction by means of one of the levers $e$, the throw of which can be varied to correspond with the variation which occurs in different thermometers in the distance between the two points usually selected by experimental determination. For this purpose these variable throw levers $e$ are provided with sleeves $f$ which are adjustable along the same, by means of leading screws $g$. The said sleeves bear trunnions or rollers $h$ which engage in longitudinal grooves $i$ in lever arms $j$ fixed to a rock-shaft $k$. The rock-shaft $k$ is oscillated, through a toothed sector $l$ and worm and bevel gearing $l^1$, $l^1$ from a vertical shaft $m$, which bears at its upper end a table $n$ for receiving the master plates hereinafter mentioned and which table is provided with means such as a hand wheel $n^1$ whereby it may be turned; the velocity-ratio of the gearing connecting this table $n$ and the thermometer slides $b$ is such that one revolution of the table corresponds to the movement of the thermometer slides required to include all the figures to be engraved on the thermometers.

Above the thermometer slides $b$ there is arranged a frame $o$ bearing a row of spring-pressed markers $p$ which are spaced apart to correspond with the spacing apart of the thermometer slides $b$, so as to be capable of resting on the stems of all the thermometers thereon along a line transverse thereto. Each marker $p$ as shown in Fig. 8 is held in a chuck 11 which forms the end of a vertical spindle 12 provided with a shoulder 13 working against a spring 14 contained in a casing 15. The spindle 12 passes through both ends of the casing 15, the end 16 of the latter forming a bearing for the spindle 12 and a stop for the shoulder 13 and the other end of said casing 15 being provided with an internally screw-threaded cap 17 which forms a bearing for the spindle 12 and an adjustable stop for the spring 14. The casing 15 is adapted to fit in a hole provided in a bar 18 of the marker frame $o$ and is formed with an external shoulder 19 and threaded nut 20 for securing it to said bar 18. The marker frame $o$ is supported by rollers such as $o^1$, $o^1$ so as to be capable of sliding freely in all directions in a horizontal plane and the said frame $o$ is actuated through suitable pantograph mechanism.

The pantograph mechanism shown in the drawing comprises a stylus $q^1$ which is adapted to follow the grooved inscriptions in the master plate or table $n$ and is mounted at one end of a substantially horizontal lever arm $q^3$, the other end of which is connected by a hinge joint to the lower end of a substantially vertical lever $q$ which has its upper end supported on a universal joint $r$ and has adjustably connected to it by a hinge joint at any intermediate point, one end of a substantially horizontal lever $s$ the other end of which is connected by a universal joint $t$ to the marker frame $o$. By this means, the marker frame $o$ will follow all the horizontal movements of the stylus $q^1$ to any desired reduced scale according to the position at which the hinge joint of the upper horizontal arm $s$ is clamped to the vertical lever. The size of the figures engraved can thus be varied as desired, the same master plates being employed for all sizes within the range of adjustment.

When using the machine the mechanism is first adjusted and then operated as follows:—

1. The thermometers to be marked are clamped in their slides, each thermometer bearing thereon the experimentally ascertained graduation to certain points on which the figuring is to be engraved.

2. The master plate table and variable throw levers $e$ are brought to what may be termed the zero position, indicated at Fig. 1 and Fig. 6 with the variable throw levers and their actuating lever arms $j$ in line with each other as in Fig. 4.

3. The thermometer carriages $b$ are then adjusted so that the initial points (indicated by the black dots Fig. 6) where the figuring is to be engraved are brought into alinement, as at 2, and in register with the engraving markers $p$ indicated by the small circles, and the carriages and thermometers are clamped in this position to the slides $e$.

4. The master plate table is now moved to the central point of another figure or group of figures representing, for example, the marking which is to be at the greatest distance from the first.

5. While the machine is in the position 4, the sleeves $f$, with the rollers $h$, on the several variable throw levers which bear on the ends of the slides $c$ are adjusted by means of the screws $g$ until their movement brings the slides $c$ and the corresponding graduations on each thermometer stem into alinement and in register with the row of markers. In this position the variable throw levers may take the position indicated at 3, Fig. 7 which also indicates the variation which will occur in the throw of the several levers from the zero position 1 when the machine is operated.

6. By now returning the table $n$ and all parts to initial position, as in Fig. 6 and putting the marker mechanism into operation and moving the stylus $q^1$ over the several inscriptions on the master plate, all the markers $p$ will be moved simultaneously through the pantograph mechanism so as to engrave the figures on the thermometer stems, and all the figures of the series can be engraved successively on all the thermometers simultaneously, each thermometer moving through distances between the successive graduations proportional to the distance between its experimentally obtained gradutions which are represented by the beforementioned marking points.

In cases where open-scale graduations are to be produced, for example, on syringe barrels or rain gages, or in cases where two different scales, e. g. cubic centimeters and minims, are balanced or used simultaneously on the same instrument, such graduations may be provided on the master plate or plates in addition to or instead of the figures, and traced over by the stylus and consequently engraved on the corresponding articles by the markers. The improved machine is also readily adapted for simultaneously marking a series of articles which vary in length.

We claim:—

1. Apparatus for simultaneously producing a plurality of markings on a series of articles comprising pantograph mechanism, a series of markers connected with said pantograph mechanism and adapted to act on the series of articles, means for carrying the series of articles, a series of variable throw levers connected with said carrying means, and means for varying the extent of throw of said levers.

2. Apparatus for simultaneously producing a plurality of markings on a series of articles comprising a movable table, a master plate mounted upon said table, pantograph mechanism adapted to coact with said master plate, a series of markers connected with said pantograph mechanism and adapted to act on the series of articles, a series of slides for carrying the series of articles, a series of variable throw levers adapted to coact with the slides, means for varying the extent of throw of said levers, and means for communicating movement of said table to said levers.

3. Apparatus for simultaneously producing a plurality of markings on a series of articles, comprising a rotary table, a master plate mounted upon said rotary table, and formed with a series of markings corresponding with those to be made on the series of articles, pantograph mechanism adapted to coact with said master plate, a frame having free movement in all horizontal directions and operated by said pantograph mechanism, a series of markers mounted upon said frame and adapted to act on the series of articles, a series of slides for carrying the series of articles, a series of variable throw levers adapted to coact with said slides, means for varying the extent of throw of said levers, and means for converting the rotary movement of said table into oscillatory movement of said levers.

4. Apparatus for simultaneously producing a plurality of markings on a series of articles, comprising a rotary table, a master plate mounted upon said rotary table, and formed with a series of markings corresponding with those to be made on the series of articles, pantograph mechanism adapted to coact with said master plate, a frame having free movement in all horizontal directions and operated by said pantograph mechanism, a series of markers mounted upon said frame and adapted to act on the series of articles, a series of slides for carrying the series of articles, a series of variable throw levers adapted to coact with said slides, sleeves adjustable longitudinally on said variable throw levers, trunnions on said sleeves, a series of arms formed with longitudinal grooves in which the trunnions engage, and means for converting the rotary movement of said table into oscillatory movement of said arms.

5. Apparatus for simultaneously producing a plurality of markings on a series of articles, comprising a spindle, a rotary table on said spindle, a master plate, mounted upon said rotary table and formed with a series of markings corresponding with those to be made on the series of articles, pantograph mechanism adapted to coact with said master plate, a frame having free movement in all horizontal directions and operated by said pantograph mechanism, a series of markers mounted upon said frame and adapted to act on the series of articles, a series of guide bars, a series of slides adjustable along said guide bars, means for securing the series of articles, to the series of slides, a spring drum connected with said guide bars to move said guide bars in the one direction, a series of variable throw levers to move said guide bars in the other direction, sleeves adjustable longitudinally on said variable throw levers, trunnions on said sleeves, a shaft, a series of arms mounted on said shaft and formed with longitudinal grooves in which the trunnions engage, a toothed quadrant on said shaft, a second shaft at right angles to the first shaft, a worm on said second shaft in mesh with said toothed quadrant, a bevel wheel on said second shaft and a second bevel wheel mounted on said spindle and in mesh with the first bevel wheel.

6. Apparatus for simultaneously producing a plurality of markings on a series of articles consisting of a main frame, a bearing in said main frame, a spindle rotatable in said bearing, a rotary table on said spindle, a master plate mounted upon said rotary table and formed with a series of markings corresponding with those to be made on the series of articles, pantograph mechanism comprising a horizontal rod, a stylus on said horizontal rod, adapted to coact with said master plate, a vertical rod coupled with said horizontal rod, a universal joint between the upper end of said vertical rod and said frame, a substantially horizontal lever adjustably connected with said vertical rod, a second frame mounted on said main frame and having free movement in all horizontal directions, a universal joint between said second frame and said substantially horizontal lever, a series of markers mounted upon said frame and adapted to act on the series of articles, a series of guide bars slidable upon said main frame, a series of slides adjustable along said guide bars, means for securing the series of articles to the series of slides, a spring drum, a band connected with said spring drum and with said guide bars to move said guide bars in the one direction, a series of variable throw levers pivotally mounted on said main frame to move said guide bars in the other direction, sleeves adjustable longitudinally on said variable throw levers, threaded lugs on said variable throw levers, leading screws rotatably connected with said sleeves and in threaded engagement with said lugs, trunnions on said sleeves, a shaft, a series of arms mounted on said shaft and formed with longitudinal grooves in which said trunnions engage, a toothed quadrant fast on said shaft, a second shaft at right angles to the first shaft, a worm fast on said second shaft and in mesh with said toothed quadrant, a bevel wheel fast on said second shaft, a second bevel wheel mounted on said spindle, and a hand wheel on said spindle to rotate said table, substantially as set forth.

GILES HENRY ZEAL.
HERBERT HENRY ZEAL.